Aug. 16, 1955   H. C. GROSSMAN   2,715,371
PARKING GARAGE
Filed May 11, 1950   4 Sheets-Sheet 1

Harry C. Grossman
INVENTOR.

BY *Clarence A O'Brien*
*and Harvey B. Jacobson*
Attorneys

Aug. 16, 1955     H. C. GROSSMAN     2,715,371

PARKING GARAGE

Filed May 11, 1950     4 Sheets-Sheet 3

Harry C. Grossman
INVENTOR.

BY *Clarence A. O'Brien*
*and Harvey B. Jacobson*
Attorneys

Aug. 16, 1955  H. C. GROSSMAN  2,715,371
PARKING GARAGE
Filed May 11, 1950  4 Sheets-Sheet 4
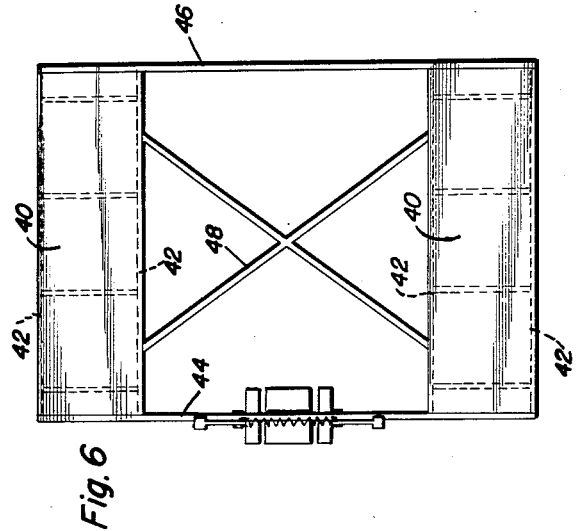
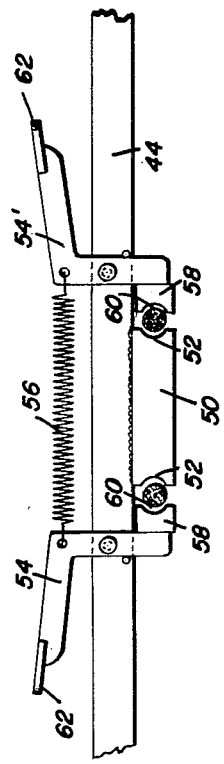
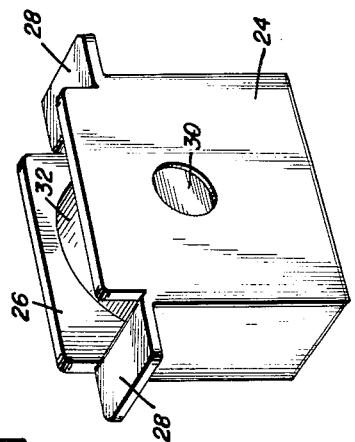
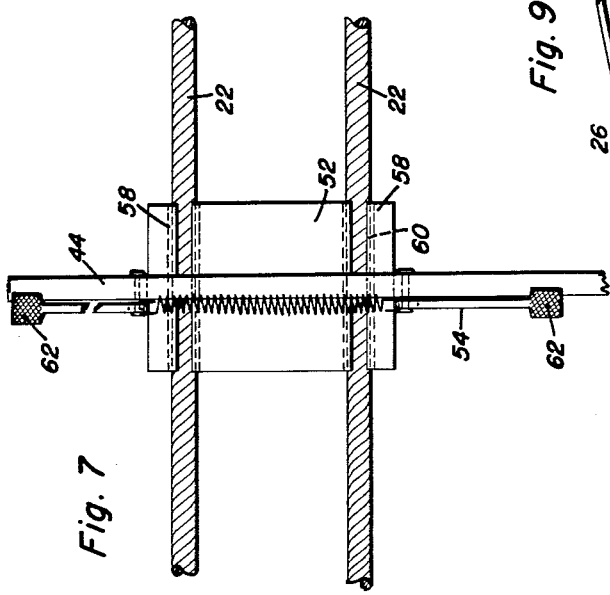
Harry C. Grossman
INVENTOR.
BY *Clarence A. O'Brien*
*and Harvey B. Jacobson*
Attorneys

United States Patent Office 2,715,371
Patented Aug. 16, 1955

2,715,371

PARKING GARAGE

Harry C. Grossman, Baltimore, Md.

Application May 11, 1950, Serial No. 161,283

2 Claims. (Cl. 104—135)

This invention relates to improvements in storage apparatus and more particularly to an improved garage for parking automobiles and like vehicles.

An object of this invention is the provision of a garage for storing vehicles in a confined space or area on horizontal floors which will make effective use of the space at hand while at the same time providing ample means for enabling the vehicles to be moved to the parking stalls for the vehicles.

A further object of this invention is to provide a parking garage in which a large proportion of the space therein may be effectively utilized for the storage of vehicles and which at the same time permits any individual vehicle to be removed from storage with a relatively small amount of movement or other stored vehicles.

Still another object of this invention resides in the provision of an improved platform conveyor for automobiles or like vehicles.

Yet another object of this invention resides in the provision of a clutch mechanism for engagement with various portions of a moving cable so as to enable a platform used in parking automobiles or like vehicles to be moved in opposite directions.

Still further objects reside in the provision of a parking garage that is capable of being constructed with a minimum of expenditure of time and labor and which parking garage can readily employ an elevator for moving cars from one floor to another.

These, together with the various ancillary objects of the invention which will become apparent as the following description proceeds are attained by this parking garage, a preferred embodiment of which has been illustrated in the accompanying drawings, by way of example only, wherein:

Figure 6 is a top plan view of the platform forming one element of the present invention;

Figure 7 is a plan view showing the construction of the clutch used in the present invention;

Figure 8 is an elevational view of the clutch mechanism;

Figure 9 is a perspective view of one of the bearing elements used in the present invention;

Figure 1:
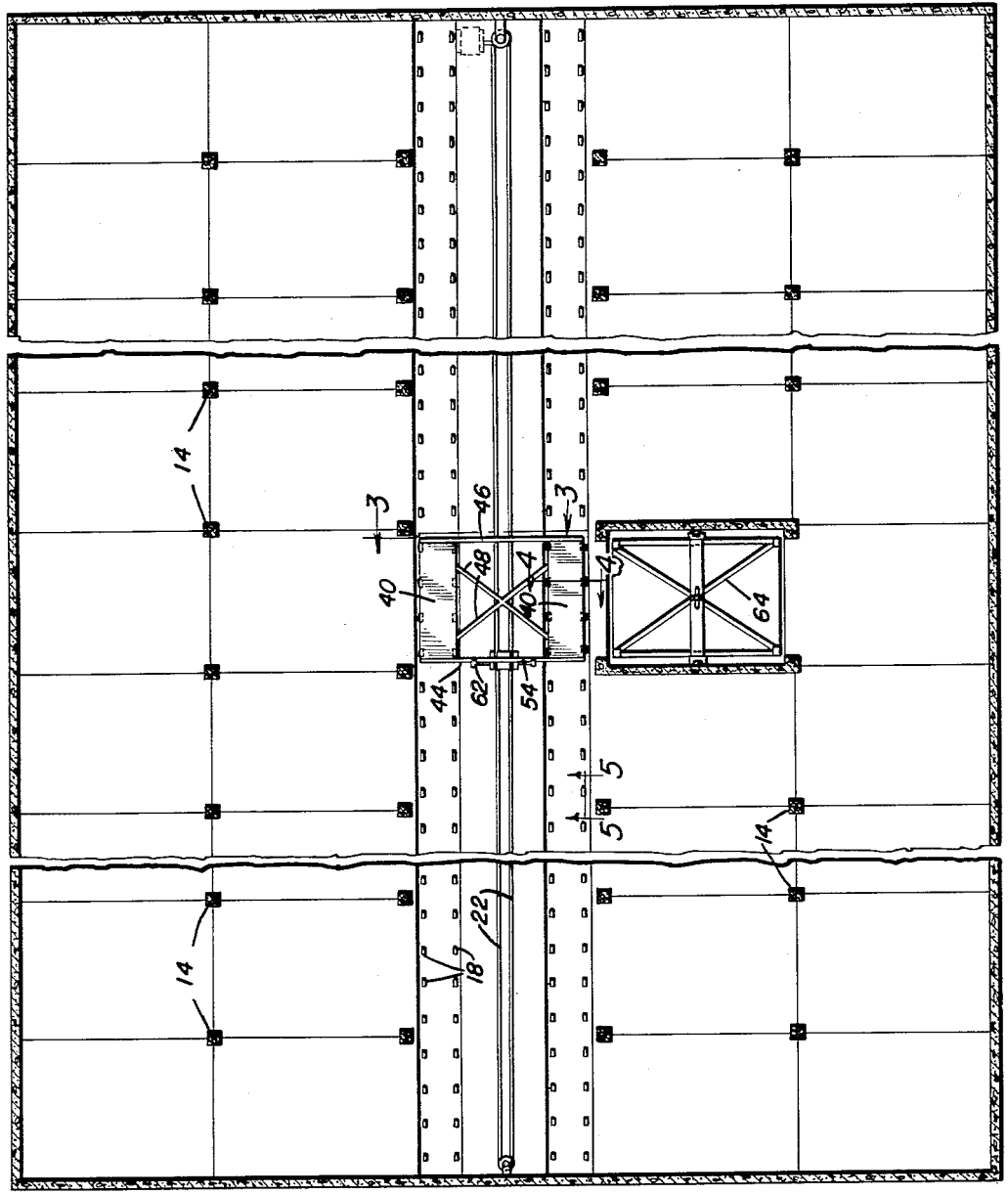
Figure 1 is a horizontal sectional view of the parking garage providing the present invention where it shows the floor plan of the garage in greatest detail.
Figure 2:
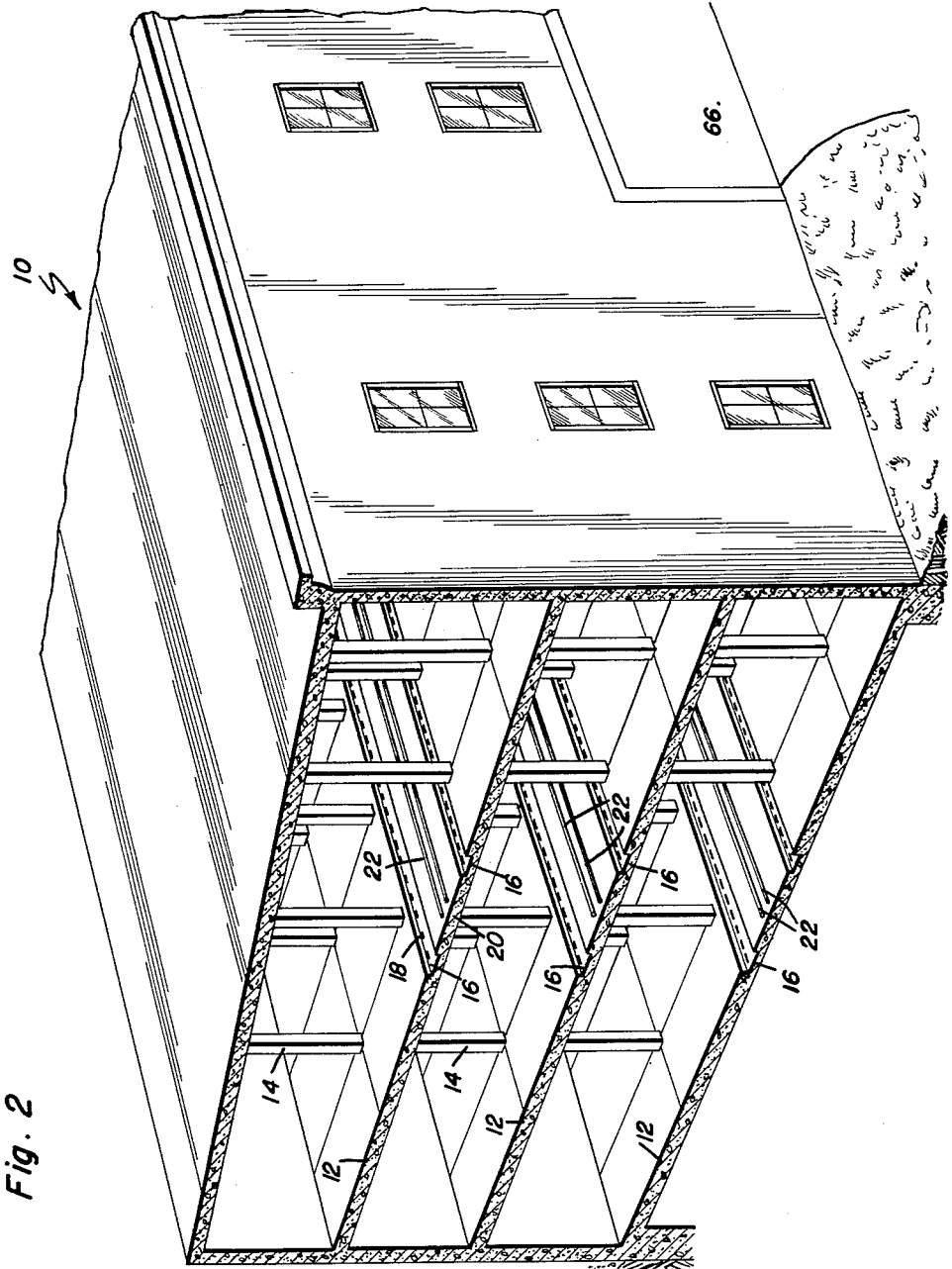
Figure 2 is a perspective view of the parking garage with parts thereof being broken away to show other parts in greater detail.
Figure 3:
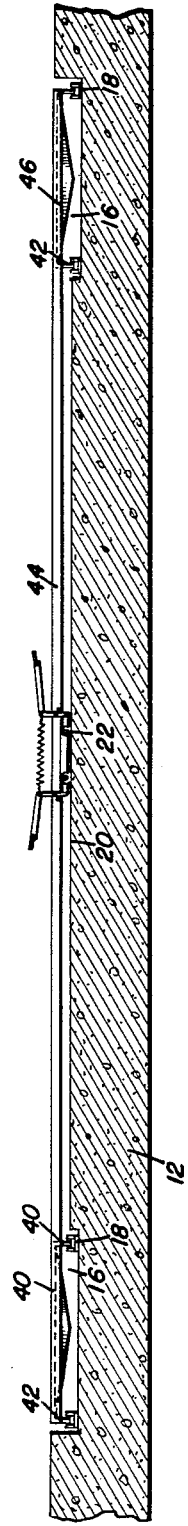
Figure 3 is a vertical sectional detail as taken along the line 3—3 in Figure 1.
Figure 4:
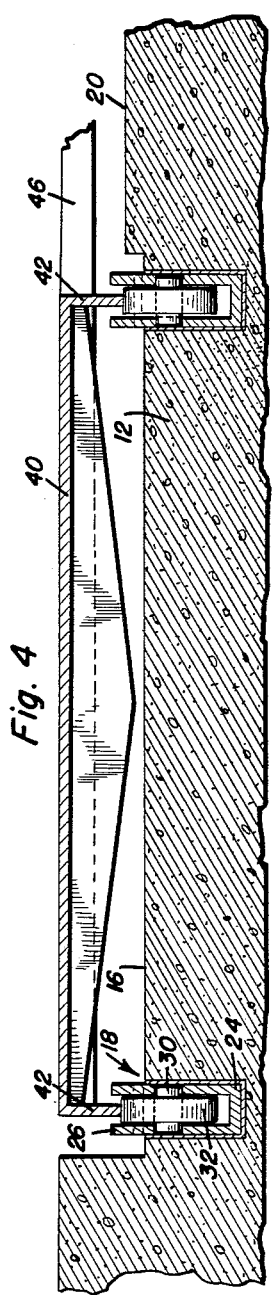
Figure 4 is an enlarged vertical sectional detail showing the manner in which the platform elements engage suitable bearings inserted in the floor of the parking garage.
Figure 10:
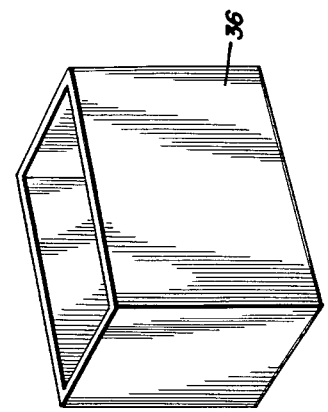
Figure 10 is a perspective view of a member used in detachably securing the bearing elements in the floor of the garage.
Figure 5:
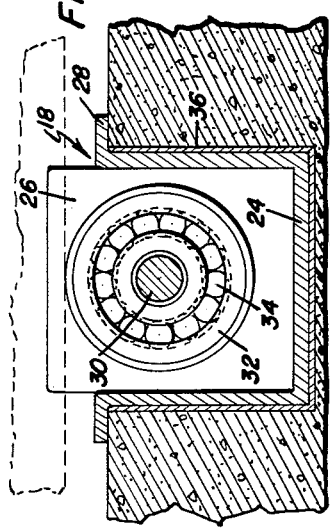
Figure 5 is an enlarged vertical sectional detail showing the construction of one of the bearing elements.

With continuing reference to the accompanying drawings wherein like numerals designate similar parts throughout the various views, reference numeral 10 generally designates a garage which is formed with a plurality of floors 12 and which has suitable columns or posts 14 for supporting the floor next above or the ceiling of the garage. As desired, there may be indicated on the floor 12 suitable lines defining stalls in which parked automobiles may be emplaced.

Formed in the floor 12 are a pair of recesses 16 defining locations in which suitable bearing elements 18 can be emplaced. Also, extending between the pair of parallel recesses 16 is a recessed portion 20 on which a suitable endless cable 22 is positioned for a purpose to be henceforth explained.

Each of the bearings 18 includes a casing 24 which is formed with upwardly extending flanges 26 and outwardly turned flanges 28 forming suitable parallel guides. Extending transversely of the casing is a shaft 30 on which a roller 32 is journaled by means of ball bearings 34. The casings 24 are adapted to contain oil or grease, not shown, for lubricating the ball bearings 34 and rollers 32. For mounting each of the bearing elements 18 there is provided a hollow rectangular member 36 which may be set in the concrete of the floors 12 so as to enable each of the bearing elements 18 to be readily removed by the use of a screw driver or the like tool.

Slidingly engaging the rollers 32 and mounted thereon are the channel-shaped members which are formed with a central supporting plate 40 and with downwardly extending flanges 42. The flanges 42 slidingly engage the rollers 32 thus enabling the platform comprised of the pair of channel-shaped members and the transverse connecting members 44 and 46 and cross spaces 48 to be easily moved thereon.

For engaging the moving endless cable 22 there is provided a clutch mechanism which includes an elongated central member 50 having end grooves 52 therein. Pivotally mounted on the transverse member 44 at opposite ends of said member 50 are L-shaped jaw members 54 which are terminally connected by a coil spring 56. Guide blocks 58 having grooves 60 therein are secured to the jaw members 54, and suitable pedal plates 62 are secured to the jaw members 54. Hence, upon depressing either of the pedal plates 62 the corresponding jaw member will press inwardly against the cable 22 thus causing the cable to be securely grasped between the jaw member and the central member 50 within the grooves 52 and 60. Immediately upon release the spring 56 will withdraw the jaw member from engagement with the cable so as to stop the movement of the platform. A suitable elevator 64 is provided for raising the vehicles from one floor to another and a drive-in entrance 66 is provided for the garage.

In use, the vehicles are taken up to the different floor levels by the elevators 64. They are driven off the elevator onto the platform with the wheels thereof being carried by the support plates 40. By means of the clutch elements the platform may then move to any one of the stalls which are suitably numbered and the cars are then driven off into the desired stalls. Obviously, by use of additional platforms the space along which the platforms move can be readily used for storing cars for short periods of time.

Since from the foregoing the construction and advantages of this parking garage are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. In a parking garage having floors and a platform adapted for transporting vehicles, a pair of horizontal recesses in a floor of the garage spaced apart and parallel, casings adapted to contain lubricant and set in the bottoms of said recesses in side by side longitudinally spaced pairs in each recess and each having side portions extending above the bottoms of the recesses, a pair of rollers journaled in each pair of casings below said portions, and a pair of inverted channel members associated with the pairs of rollers, respectively, and each having a pair of depending side flanges riding on the associated pairs of rollers between the extending side portions of the casings in which the associated rollers are journaled and for guided movement over said rollers by said portions, said channel members being cross connected for unitary movement and adapted to be embodied in said platform.

2. The combination of claim 1, and rectangular hollow members set into said bottoms and in which said casings are removably fitted, said casing having lateral flanges overlying said members for prying upwardly to remove said casings.

References Cited in the file of this patent

UNITED STATES PATENTS

| | | |
|---|---|---|
| 1,102,828 | Varian | July 7, 1914 |
| 1,418,714 | Humphries | June 6, 1922 |
| 1,431,699 | Shnable et al. | Oct. 10, 1922 |
| 1,838,823 | Gillespie | Dec. 29, 1931 |
| 1,847,549 | Adams | Mar. 1, 1932 |
| 1,902,205 | Webster | Mar. 21, 1933 |
| 2,541,220 | Perret | Feb. 13, 1951 |

FOREIGN PATENTS

| | | |
|---|---|---|
| 10,617 | Sweden | Jan. 24, 1899 |